United States Patent [19]

Reagan et al.

[11] Patent Number: 4,729,737
[45] Date of Patent: Mar. 8, 1988

[54] AIRBORNE LASER/ELECTRONIC WARFARE TRAINING SYSTEM

[75] Inventors: Robert L. Reagan; Theodore Nietzold, both of Huntsville, Ala.

[73] Assignee: Teledyne Industries, Inc., Huntsville, Ala.

[21] Appl. No.: 869,773

[22] Filed: Jun. 2, 1986

[51] Int. Cl.⁴ .............................................. G09B 9/08
[52] U.S. Cl. ...................................... 434/35; 434/33; 434/14; 434/16
[58] Field of Search ..................... 434/33, 34, 35, 16, 434/17, 18, 19, 20, 21, 22, 14

[56] References Cited

U.S. PATENT DOCUMENTS

| | | | |
|---|---|---|---|
| 2,454,503 | 11/1948 | Crane | 434/240 |
| 2,494,566 | 1/1950 | Linderman, III | 434/240 |
| 2,563,777 | 8/1951 | Ellison | 52/813 |
| 2,685,747 | 8/1954 | Hicken | 434/243 |
| 2,721,397 | 10/1955 | Gallo | 434/243 |
| 3,020,649 | 2/1962 | Samson | 434/241 |
| 3,068,589 | 12/1962 | Bonwit | 434/2 |
| 3,798,795 | 3/1974 | Michelsen | 434/19 |
| 3,877,157 | 4/1975 | Ashford et al. | 434/22 |
| 3,955,292 | 5/1976 | Robertsson | 434/22 |
| 4,057,913 | 11/1977 | Eisenberg | 434/14 |
| 4,139,868 | 2/1979 | Eisenberg et al. | 360/33.1 |
| 4,176,468 | 12/1979 | Marty, Jr. | 434/14 |
| 4,340,370 | 7/1982 | Marshall et al. | 434/22 |
| 4,474,501 | 10/1984 | LaRussa . | |
| 4,490,117 | 12/1984 | Parker | 434/35 |

*Primary Examiner*—Leo P. Picard
*Attorney, Agent, or Firm*—Beveridge, DeGrandi & Weilacher

[57] ABSTRACT

A system for training aircrews, particularly aircrews of relatively slow-moving aircraft such as helicopters in laser/electronic warfare countermeasure tactics and the use of laser/electronic warfare countermeasure equipment is provided. The system is operable with the aircraft's instruments to present the simulated threats whenever such threats are both with the line-of-sight of, and within the presentation range of the aircraft. Accordingly, such a system includes a plurality of independently operating threat-simulating transmitter units simulating both stationary and non-stationary threats by broadcasting omnidirectional radio frequency signals over a common carrier frequency. On-board equipment, carried on the aircraft determines whether the aircraft is both within the line-of-sight and within presentation range to the threat based upon receipt of the transmitter unit signals and the location of the threats relative to that of the aircraft. When, determined by the on-board equipment, that both the requisite line-of-sight and presentation range conditions are met, a controller, constituting an important part of that equipment, causes the aircraft instruments to present such threat in proper perspective as to both direction and range, to the crew over the aircraft's radar warning receiver and intercom system.

20 Claims, 5 Drawing Figures

AIRBORNE LASER/ELECTRONIC WARFARE TRAINING SYSTEM

BACKGROUND OF THE INVENTION

The present invention pertains to a system, operable with the instruments of an aircraft, particularly a slow-moving aircraft, for inflight training in the use of laser and/or electronic warfare countermeasure equipment and tactics. More particularly, the system of the present invention operates the instruments of the aircraft to present threats to the aircrew according to whether the aircraft is within range, and within the line-of-sight of the threat.

It is believed that systems for providing inflight training to pilots and/or aircrews in electronic warfare equipment and tactics generally have followed one of two approaches. The first general type are those systems employing one or more stationary radar signal emitters to simulate the signal characteristics of a particular threat. In this family, the systems frequently require activation of the entire radar warning receiver system in the aircraft. The other type of system differs from the first by generally eliminating to ground based emitters to provide a self-contained, signal generating unit aboard the aircraft.

U.S. Pat. No. 4,176,468 provides at least a general description of each of the latter types of training systems. Illustratively, systems of the first type employ signal transmitting and receiving stations and include an air combat maneuvering range having a ground-based control station, at least one training craft and of course, the plurality of signal transmitting and receiving stations. The aircraft's position is computed by multilateration using at least three of the emitting/receiving stations. When the aircraft is in the proper geographical position and altitude to detect the threat, the ground station activates onboard maneuvering instrumentation and equipment which in turn controls the radar warning receiver to provide audio and visual cues accordingly. The pilot's reactions to the threats are then monitored at the ground display and control station.

Also illustrative of earth-based simulator systems is U.S. Pat. No. 4,057,913 wherein a computer on board the aircraft receives flight parameter data from the aircraft's instruments and transmits this data to a ground based simulator station. The simulator station remotely controls one or more sonobuoy transmitters which in turn produce target signals, emulating the signal produced by a submarine or surface vessel. According to this patent, the aircraft's flight crew recognizes no difference between the signals produced by the sonobuoys and the signals generated by an actual enemy target.

The prior art recognizes that systems of the emitter type have various shortcomings such as unusually high cost and complexity. Further, such systems are said to emit large amounts of electromagnetic radiation so as to interfere with local television and radio communications, and, that such strong electromatic fields are said to be easily monitored by hostile powers, thus compromising the security of those systems. Finally, it is said that such systems require complex communication networks between the ground control stations, the threat mimicking stations, and the aircraft.

To overcome some of such shortcomings, U.S. Pat. No. 4,176,468 discloses a system of the type where the threat mimicking radar stations are eliminated. The stations are replaced by a threat instruction receiver and a threat simulator, both carried aboard the aircraft. The equipment aboard the aircraft is programmed by the ground-based control station.

Systems wherein all or substantially all of the equipment is carried aboard the training aircraft are suitable for fighter or other relatively fast moving aircraft. However, such systems are very unsatisfactory for slow-moving aircraft such as helicopters. Often, systems of the second general type rely on preprogrammed values to ascertain the "line-of-sight" between an electronic warfare threat and the aircraft. For example, the line-of-sight determination is made by electronically deriving the aircraft's position and comparing this position with threat locations and training area terrain features, all of which are preprogrammed into on-board memory before the commencement of combat training maneuvers.

Errors in determining the aircraft's precise position, and, errors in the preprogrammed parameters however, could compound to result in aggregate errors of several hundreds of feet in the line-of-sight determination. Such errors are intolerable for helicopter training where the helicopter crew must be trained to fly very low to the ground and to hover behind ridges or other high terrain in order to avoid exposure to various laser or electronic warfare threats. Thus, for the purposes of training the crews of helicopters and other slow-moving aircraft in countermeasure tactics for electronic warfare, exact line-of-sight simulation must be provided. Such training, as will be appreciated, is also very useful for inflight training in relatively fast moving aircraft.

SUMMARY OF THE PRESENT INVENTION

The inflight training system of the present invention is particularly suitable for training crews of slow moving aircraft in the use of electronic warfare equipment, and in the execution of appropriate electronic warfare maneuvers. Accordingly, the system of the present invention simulates both mobile threats and stationary threats. In the preferred system, a memory, aboard the training aircraft, stores data representing the geographic location and the identity of each deployed stationary threat. For mobile threats, such location and identity data are transmitted from the threat to on-board equipment. A controller, also part of the on-board equipment, continually compares the either stored or received location data with data providing the instantaneous position of the aircraft to determine the direction and distance to each of the simulated threats.

Each threat is embodied by an independently operating, ground based radio frequency transmitter unit capable of transmitting a unique code. When so encoded, the signal from the transmitter includes a code which identifies the specific transmitter and therefore the type of threat simulated. The code could further provide the location of the threat. A unique feature of such transmitter units is use of a common transmitting frequency. Each threat will transmit approximately once a second for a duration of approximately 5-15 milliseconds. An anasynchronous time-division, multiplexed network is used in the communication between aircraft receiver and ground threat transmitters. Only a small number of threat signals are received at any one time and due to their short duration, the randomly spaced transmissions reduce the probability of transmitter interference to a very low and acceptable level.

Further each threat-simulating transmitter unit is omni-directional. However, if the aircraft hovers behind a ridge line, a building or any other obstruction, the signal from the threat-simulating transmitter unit will not be received by the on-board equipment. Thus, no threat will be presented to the crew by the system. On the other hand, when the signal from the threat-simulating transmitter is received by the on-board equipment, and when that equipment determines from on-board memory the threat type and location data and the aircraft flight data, that the aircraft is within a range appropriate for presentation of the threat, the threat is made known to the aircrew. Preferably, the system presents the threat as a visual display indicating the direction to the threat and an audio warning signal over the aircraft intercom/radio system. The visual display may be of the strobe type or the digital type.

The system of the present invention duplicates real-life electronic warfare scenarios by providing an exact simulation of the line-of-sight and the range for realistic threat presentation. Moreover, since the present system utilizes encoded, radio frequency transmitter units, rather than costly radar emitters, to simulate line-of-sight to the threats, the system can provide a multiple threat scenario at very low costs. Further, the radio frequency transmitters can be of low power and can be set (tuned) so as to avoid interferring with radio and television transmissions. The low-power transmitter units thereby also eliminate most security problems and result in an easily maintainable system. Finally, since the system preferably carries on-board recording equipment, recording both the display of the simulated threats by the aircraft instruments and the crew's subsequent countermeasures for each threat, the entire exercise may be replayed after the exercise for instructive purposes. Thus, all of the elements of a complete training system are embodied by the ground-based transmitter units and the on-board equipment so that the complex and expensive ground control systems typical of the prior art are obviated.

An inflight training system for training the crews of aircraft in electronic warfare countermeasures and equipment, in accordance with the present invention, includes a plurality of threat-simulating transmitter units. To simulate stationary threats, the transmitter units must broadcast a signal at least encoded with data identifying the particular transmitter and thus the particular threat simulated by that transmitter. The signal is detected by equipment aboard the aircraft when the aircraft is within range of and within the line-of-sight of the particular threat. For mobile threats, the signal is also encoded with threat location data which likewise is received by the on-board equipment when the aircraft is within presentation range and line-of-sight of the threat. Each threat-simulating transmitter unit produces an omni-directional signal. Preferably, all such signals are transmitted over the same frequency. The signals are broadcast periodically for short intervals to minimize transmitter interference. A receiver, included within the on-board equipment, detects the signals from the transmitter units whenever such units are within presentation range, and within the line-of-sight of the aircraft.

A central controller and a memory, are likewise made a part of the on-board equipment. Preferably, prior to execution of the training exercises, the memory is loaded with the unique identification date for each threat to be simulated during the exercises. For stationary threats, preferably, the memory is also preloaded with data providing the fixed location of that threat.

During the mission, the controller calculates the distance between the aircraft and the various fixed threats from instantaneous flight position data and stored threat location and identification data. When the aircraft comes within a range appropriate for presenting the threat and when the receiver detects the uniquely coded identification signal from that threat, the controller causes presentation of the threat by the aircraft instruments since the threat is both within presentation range and line-of-sight to the aircraft.

Likewise for mobile threats, the controller causes presentation of a threat whenever such is within a predetermined range of and further, within the line-of-sight of the aircraft. Since the threats are mobile, the threat location cannot easily be stored in on-board memory and thus such data is actually transmitted to the on-board equipment by the individual mobile threats along with their particular identification codes. Thus, to receive the encoded signals from the threats, the aircraft and the threat must be within line-of-sight to meet the line-of-sight requirement. Then since the location and the identity of the threat is provided to the controller, the controller can ascertain whether the aircraft is also within range of the threat and determine whether or not to present the threat accordingly.

The resulting system duplicates line-of-sight of the aircraft to the simulated threats. Thus, the crew can be trained to advantageously use ground terrain or other obstructions to avoid confrontations with simulated threats until such time as measures to defeat the threats can be taken. The threat is made known to the crew over the aircraft radar warning receiver equipment and the intercom audio just as would be done in actual combat.

In the preferred embodiment of the system, the controller also causes a recording subsystem to record the crew's performance for subsequent playback and evaluation. Indeed, the entire training mission may be recorded on tape for playback. The playback recreates the entire flight of the aircraft over a video map with the aircraft and the various threats superimposed over such map. The initial presentation of the threat by the aircraft instruments and the aircrew's actions in identifying and countering the threat are also displayed. As each threat simulating transmitter operates independently, and as all of the recording equipment is placed on-board under control by the central controller, the present system makes unnecessary a complicated ground-based control station.

BRIEF DESCRIPTION OF THE DRAWINGS

These and other aspects of the present invention are more apparent from the following detailed description and claims, particularly when considered in conjunction with the accompanying drawings in which like parts bear like reference numerals. In the drawings:

DETAILED DESCRIPTION OF AN EMBODIMENT OF THE INVENTION

Figures 1, 2:
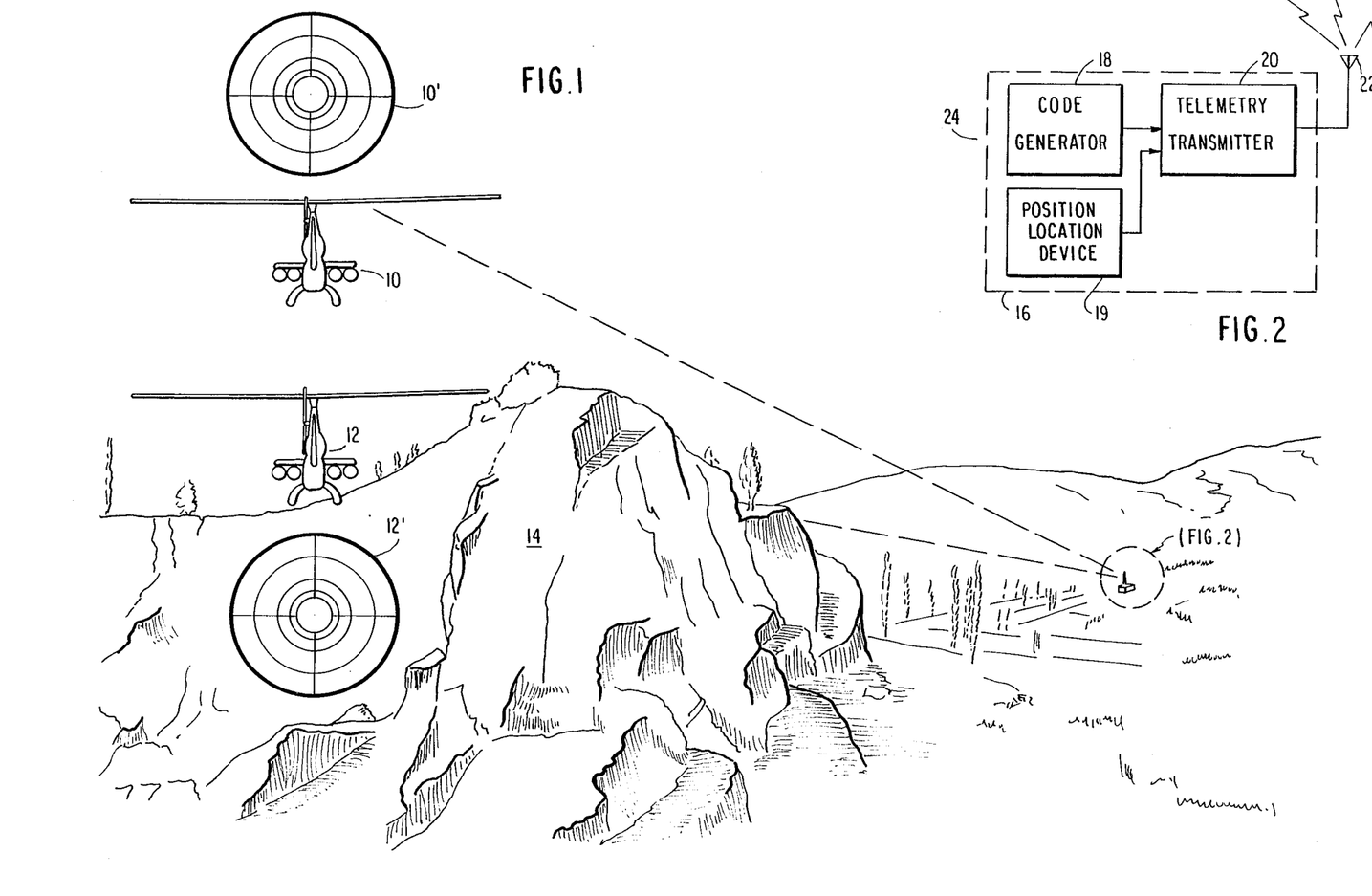
FIG. 1 depicts two training helicopters equipped according to the present invention.
FIG. 2 is an enlarged, view in block diagrammatic form, depicting the threat-simulating transmitter shown in the circled area of FIG. 1.

FIG. 1 depicts two helicopters 10 and 12, each equipped in accordance with the present invention to execute electronic warfare countermeasure exercises. Radar signal indicators 10' and 12' are shown in connection with helicopters, 10 and 12, respectively. Signal indicators 10' and 12' represent the visual display generated by the aircraft's instruments, particularly, the aircraft's radar warning receiver system.

As depicted in FIG. 1, helicopter 10, at an elevation above ridge 14, receives the signal from threat-simulating transmitter unit 16. Threat-simulating transmitter unit 16 comprises an independently operating, conventional, radio frequency transmitter unit. As shown in a magnified, block diagrammatic view in FIG. 2, threat-simulating transmitter unit 16 includes a code generator 18, a position locating device 19, a transmitter 20 and an antenna 22. A portable source of electrical power (not shown) such as a battery is used to provide power to transmitter unit 16.

It is understood that threat-simulating transmitter unit 16 is utilized to simulate any threat, conveniently referred to hereafter as 24, employed in the training exercises. Hereinafter, for convenience, threat 24 will represent both stationary threats having a fixed position on the ground and mobile threats which move relative to the earth. To simulate a stationary threat, transmitting unit 16 need only be set up on the ground and left to freely operate. A mobile threat could be simulated, for example, by placing transmitting unit 16 upon a land vehicle. Exemplary of the types of threats which might be simulated are enemy aircraft, surface-to-air missiles, ground-based laser systems, or ground vehicles such as tanks. These threats are common in that they employ radar or laser systems in their maneuvers and/or control and thus, the detection of signals from such enemy radar systems is what the system of the present invention simulates.

Where threat 24 is to simulate generally mobile threats such as tanks or like combat vehicles, code generator 18 and device 19 each produce codes providing information representing both the particular type of threat intended to be simulated and the instantaneous position of that threat, respectively. Such coding could produce, for example, a particular tone when reproduced by an audio system. The identication code for each threat simulating transmitter unit is unique and corresponds to a particular threat. The particular code is superimposed upon a carrier signal generated by transmitter 20. On the other hand, as will be further discussed herein, where the threat to be simulated is of the stationary type such as a missile launching station or a ground-based laser facility, the signal from transmitter unit 16 need only be encoded with information identifying the transmitter unit and therefore the threat. Similarly, this code could be reproducible as a particular tone on audio equipment. Thus, where transmitting unit 16 simulates a stationary threat, device 19 remains inoperative, and indeed can be omitted altogether. Alternatively, the carrier signal broadcast for stationary threats could also be encoded with both threat identification and location information and the resulting system would fall well within the scope of the present invention.

Threat-simulating transmitter 16 transmitts an omnidirectional signal so that the signal can be received anywhere within the range and the line-of-sight of the transmitter. As used herein, the term presentation "range" denotes a predetermined distance away from threat 24 at which the presence of the threat will be made known to the crew. On the other hand, the term transmission range merely refers to the maximum distance at which the transmitter unit signals can be detected. As will be better appreciated from the following, the "presentation" range could be any distance less than or equal to the "transmission" range. The term "line-of-sight" refers to a direct, or unobstructed radio frequency path between the aircraft and threat 24. Thus, as depicted in FIG. 1, aircraft 10 detects the signal from threat 24 since the aircraft is within both presentation and transmission range of the transmitter and further is within the line-of-sight to the threat.

According to the preferred implementation of the present system, training exercises involve several threats of various types including both mobile threats and stationary threats. However each threat-simulating transmitter unit 16 preferably transmitts on the same frequency. To avoid interference between several spaced-apart transmitting units 16, the transmission from each unit will have a short duration, on the order of 5 to 15 milliseconds with such transmission being repeated approximately every second. Thus since the threats 24 are spaced apart along the training course, the small number of threat signals received at any one time in combination with the preferred signals characterized by their short, randomly-spaced duration reduces the probability of intertransmitter interference to a very low, acceptable level.

As previously described, helicopter 10 detects threat 24 and therefore indicates the presence of the threat on signal indicator 10'. Helicopter 12 on the other hand, although within presentation range of threat 24 cannot detect the signal therefrom due to terrain obstruction, or ridge 14 which prevents receipt of the signal by the aircraft. Consequently, indicator 12' of helicopter 12 does not indicate the presence of threat 24. Where helicopter 12 would rise to an elevation over ridge 14, helicopter 12 would also come within the line-of-sight of threat 24 and therefore would begin to detect the signal therefrom.

Figure 3:
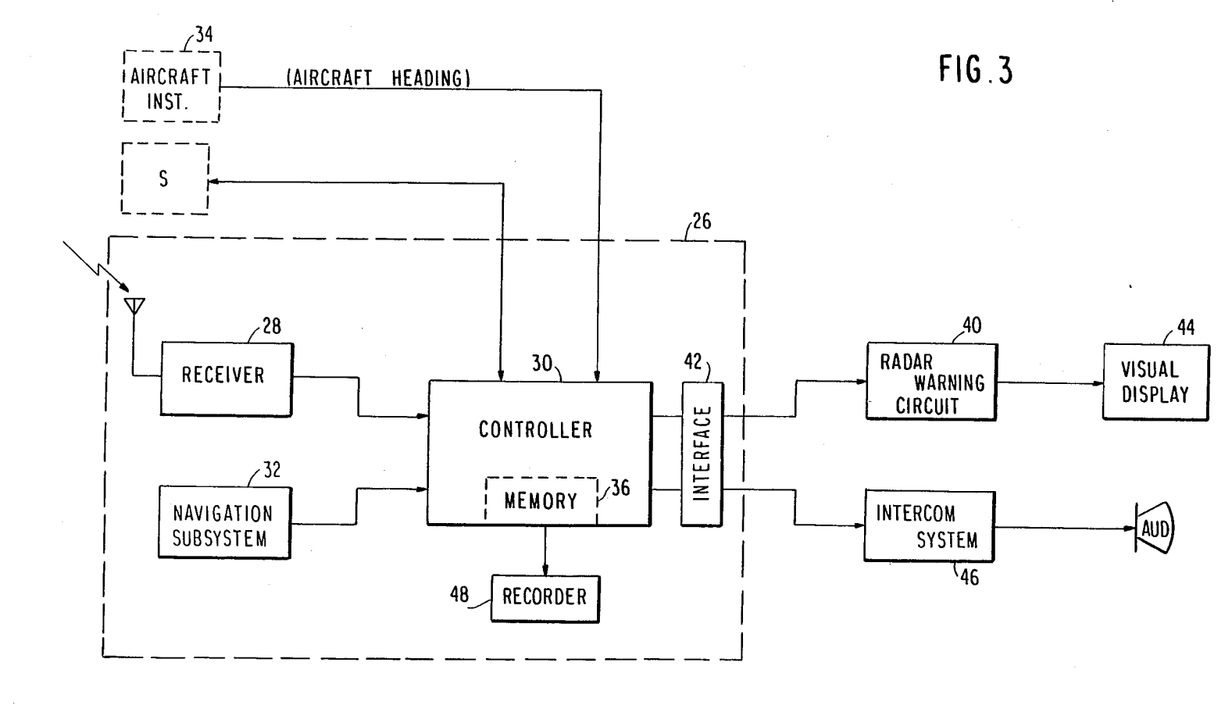
FIG. 3 is a block diagram of the on-board equipment of the inflight training system in accordance with the present invention.

FIG. 3 shows in block-diagrammic form, the onboard equipment 26 carried by helicopters 10 and 12, participating in the electronic warfare training exercises. Receiver 28 is tuned to the transmitting frequency of deployed simulating threat transmitter units 16. Receipt of the signal from any threat 24 by receiver 28 is indicated to controller 30. Controller 30 is the brain of on-board equipment 26 and thus coordinates the operation of the remaining elements of the on-board equipment. Ideally, controller 30 comprises a microprocessor or microcomputer.

On-board equipment 26 also includes a conventional navigation subsystem 32 which communicates with controller 30. Navigation subsystem 32 may be of the doppler type. Alternatively, subsystem 32 could comprise a LORAN (long range navigation) device of the type well known in the aviation arts. Subsystem 32 furnishes controller 30 with data representing the immediate position of the aircraft.

In the preferred system, controller 30 also receives data indicating the aircraft heading from the appropriate instruments of the aircraft. Such instruments are generally indicated by the broken-line block having reference numeral 34 in FIG. 3. Finally, controller 30 receives input data corresponding to the crew's activities i.e. the crew's actions in identifying and defeating the threat. This data is supplied to controller 30 whenever the crew operates any of various manual switches or controls generally represented by the broken-line block S.

Controller 30 communicates with a memory 36. Memory 36 may be internal as shown in FIG. 3. Alternatively, memory 36 could comprise a distinct circuit communicatively interfacing with controller 30.

At a time prior to the execution of the electronic warfare training exercises, data pertaining to the type and the position of each stationary threat 24 to be simulated in the exercises are stored in memory 36. Because the identification and location data for the fixed threats are preloaded in memory 36, each fixed threat transmitter unit need only broadcast a signal encoded with unique threat identification coding. The locations of the deployed mobile threats change in time, however, and so such position data cannot normally be preloaded into memory 36.

For a stationary threat, controller 30 calculates the range to the threat from the aircraft's position and heading data received by controller 30 from the aircraft instruments 34 and the threat identification and location data stored in memory 36. By means of the heading data furnished by instruments 34, controller 30 also ascertains the relative heading with respect to the fixed threat. Thus, when the aircraft position and heading data are such that the aircraft is within presentation range of the fixed threat and, provided that the threat is also within the line-of-sight of the aircraft, the same threat is oriented on the aircraft radar warning receiver display as an actual threat would be displayed.

For nonstationary threats, controller 30 receives threat position and identification information from receiver 28. For each mobile threat 24, data providing the location of the threat at any given time and the identification of the threat is broadcast by transmitter 20. The exact position of the mobile threat is provided to unit 16 in any conventional way by position location device 19. Device 19 thus could comprise a LORAN, GPS, or any other navigation-type system providing the geographic location of unit 16 for transmission by transmitter 20. Thus transmitting unit 16 comprises a telemetry transmitter unit, the signal from which is decoded as it is processed by controller 30 to provide location and identification data for mobile threats.

Alternatively, it is evident that receiver 28 could itself decode the threat position data generated by device 19 and transmitted by transmitter 20. The decoded data would then be supplied to controller 30 without need for subsequent decoding.

Controller 30 communicates with the aircraft radar warning circuitry 40 by means of interface or output buffer circuit 42. Interface 42 may be of any conventional type communicatively connecting controller 30 and warning circuit 40. Radar warning circuit 40 in turn connects to visual display 44, figuratively depicted by indicators 10' and 12' in FIG. 1. It is appreciated that display indicators 10' and 12' are merely exemplary and that visual display 44 may comprise a display of the strobe type, such as the armed forces' APR-39VI. Alternatively, display 44 could be of the digital type as provided in the United States Airforce's ALR-69 system, or other Airforce systems. Indeed, essentially only software changes are needed to convert from one type of display to the other. Intercom system 46, also connected to controller 30 by means of interface 42, provides audio warning signals to the crew members, such as by a tone generated at their headsets (not shown).

Switches S used by the aircrew for dropping chaff, flares, turning on EW countermeasures, jammers, etc. are monitored by the controller 30. If the countermeasure procedures employed by the crew are correct and effective in defeating the threat as under actual combat conditions, controller 30 will direct the aircraft radar warning circuit 40 and intercom system 46 to indicate effective avoidance of the threat as would occur in a real life situation against real threats.

Digital recorder 48 is also a part of on-board equipment 26. Controller 30 operates recorder 48 to produce a digital recording of the training exercises.

Recorder 48 records the necessary aspects of the training mission to enable recreation of the mission for the crew. For example, recorder 48 records the aircraft's flight pattern including position and heading during the mission. It further records all activity of the aircraft's radar warning circuit 40 in indicating the presence of threats to the crew and the crew's countermeasures in reacting to the displayed threats. Thus, the crew's operation of switches/controls S for releasing chaff, flares or for activating radar jamming equipment is all recorded during the mission. Additionally, the aircraft's air speed, altitude and like parameters could be recorded.

In carrying out inflight training exercises with the system of the present invention, stationary threat simulating transmitter units 16 are positioned according to a known pattern within the training area. Memory 30 is preloaded with data representing the type (i.e. the identification code for) and the exact position of each simulated stationary threat so deployed. Thus, the unique identification code broadcast by each stationary threat 24 is recognizable to controller 30. To simulate mobile threats, a number of transmitter units 16 are placed aboard vehicles to move about freely. For these transmitter units, code generator 18 encodes the transmitter signal 20 with threat identification data but also location data for each mobile threat is provided automatically by device 19 comprising a LORAN, GPS, or other navigation system. The location system will continuously provide location data for transmission so that the controller can determine the relative position of that threat. Alternatively, for simplicity, the navigation/location device 19 of each deployed threat could remain operative irrespective of stationary or mobile deployment and controller 30 upon identifying the threat as one of the fixed type could be made to disregard the location data.

Figure 4:
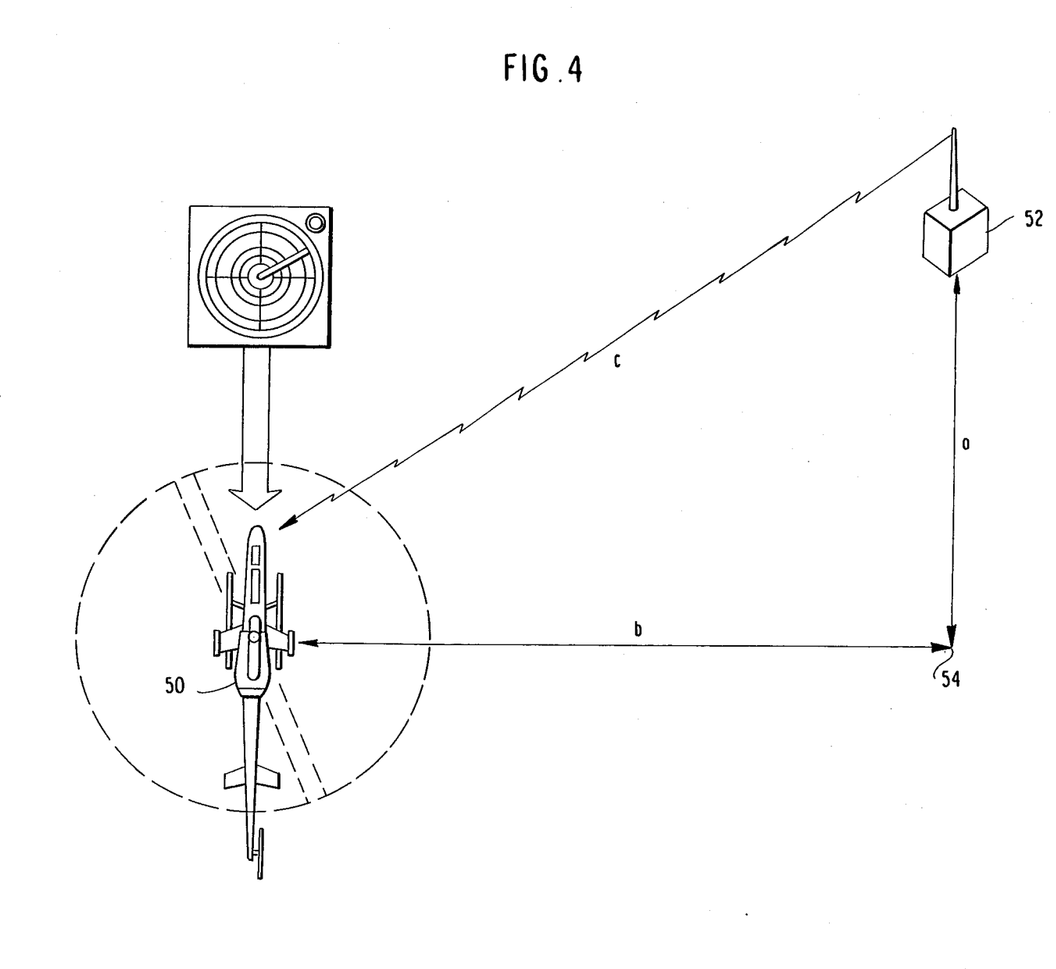
FIG. 4 is a diagram useful in understanding the system of the present invention.

With reference to FIGS. 1, 3 and 4, operation of the inflight training system of the present invention will be described first where threat 24 is stationary. Both helicopters 10 and 12, equipped with on-board equipment 26, are depicted as being within range to receive the signal from threat 24. However, receiver 28 of aircraft 10 also receives the signal from threat 24, while the signal is prevented from being received by helicopter 12 due to obstructing ridge 14. Thus controller 30 of aircraft 10 responds to the signal detected by receiver 24 since threat 24 is then both within the presentation range of, and within the line-of-sight of, helicopter 10.

These two conditions being met, controller 30 of aircraft 10 controls radar warning circuit 40 and intercom system 46 to appropriately alert the crew of threat 24 by means of visual display 44 and an audio signal, overheard by the crew.

As for helicopter 12, no display corresponding to threat 24 is presented. By comparing the instantaneous aircraft's position data to the threat location data stored in memory 36, controller 30 determines that aircraft 12 is within presentation range of threat 24. 5 Controller 30, however, does not cause radar warning circuit 40 and intercom system 46 to present the threat until receipt of the signal from the threat by receiver 28.

In this way, the system of the present invention simulates actual electronic warfare scenarios involving slow or fast moving aircraft. It does not depend upon stored elevation and position data for ridge 14 in order to determine whether to present the threat. Rather, receiver 28 must detect a signal from threat-simulating transmitter unit 16 of the present system as a condition precedent to presenting threat 24 to the crew over the aircraft's instruments. Thus, the aircraft must be both within the presentation range of, and within the line-of-sight of the threat before the presentation thereof.

If threat 24 is mobile, transmitter unit 16 not only generates the carrier signal but also encodes it with information relating to the geographic location (latitude and longitude) of the threat. Receiver 28 supplies this information to controller 30 where it is decoded. Controller 30 then determines whether the mobile threat is within presentation range of the aircraft from the aircraft's position data obtained from navigation subsystem 32 and the decoded threat location data. Since the aircraft must be in the line-of-sight of the threat in order for receiver 28 to receive the signal, the threat 24 will be presented as long as it is within the requisite range. Thus likewise, when both conditions regarding range and line-of-sight are met, controller causes the appropriate presentation of the threat in the manner discussed.

Reference is made to FIG. 4 in calculating the range to a mobile threat. When the threat location data is decoded by controller 30, the controller need only calculate the actual distance of the threat from aircraft 50 by the relation $a^2+b^2=c^2$ where c is the hypotenuse of a right triangle defined by the aircraft 50, the threat 52, and the point 54 defined by dropping a vertical from the threat to the X-axis, extending through the helicopter. Thus c is the actual distance between helicopter 50 and threat 52, and a and b are the opposite and adjacent legs of that triangle respectively. Alternatively, the actual distance and direction (heading) between threat 52 and the aircraft 50 can be determined in a variety of other ways as is obvious to those skilled in the art. Controller 30 then determines whether the actual distance so obtained is within the presentation range of the threat and controls circuit 40 and system 46, accordingly.

Figure 5:
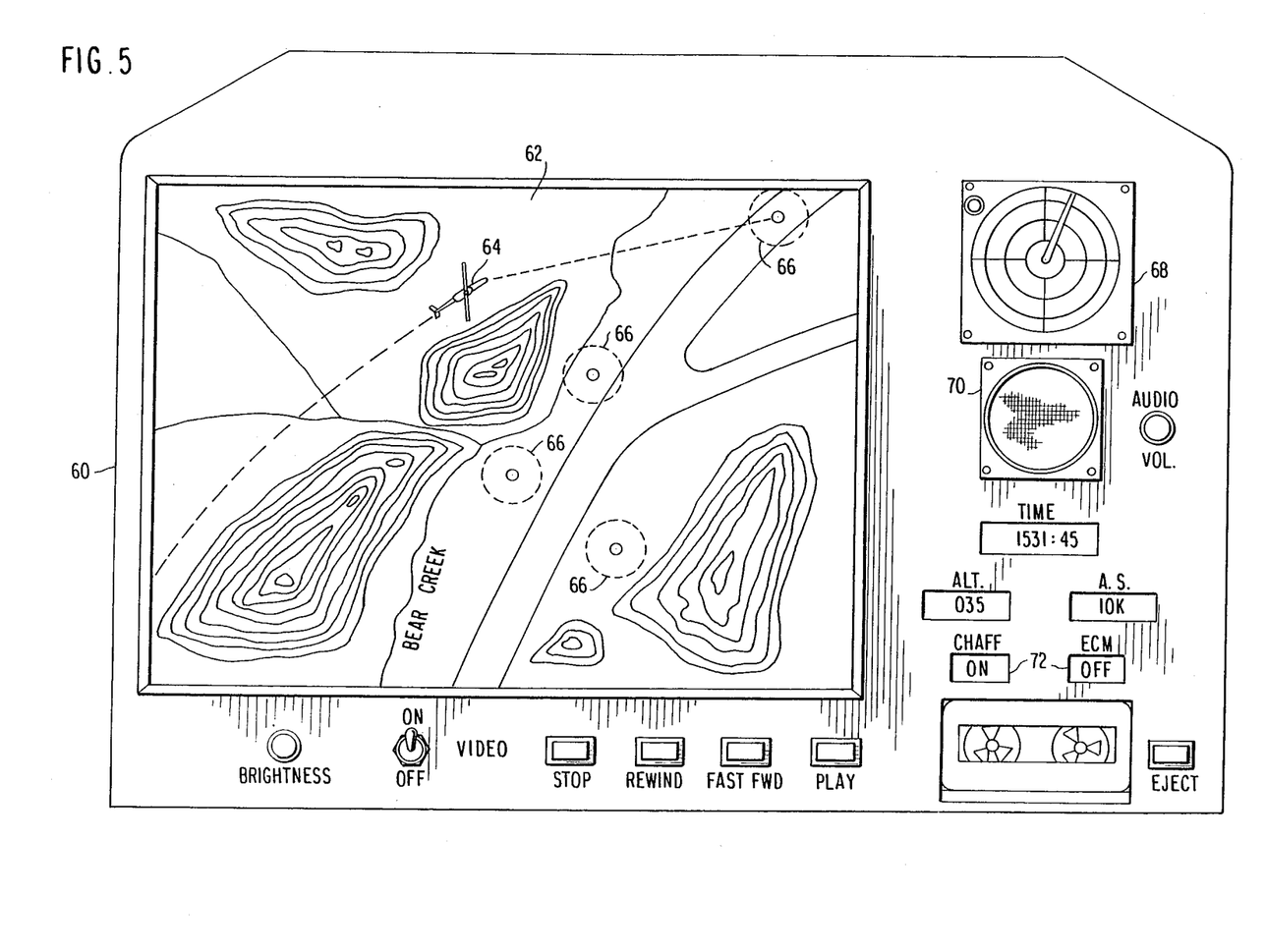
FIG. 5 is a perspective view of a video replay machine for reproducing the training exercises undertaken with the aid of the system of the present invention.

Controller 30 causes all events occurring during the mission to be recorded by digital recorder 48. FIG. 5 shows a playback unit 60 suitable for playing back that which is recorded during the mission by recorder 48. Exemplary playback unit 60 presents a video image of map 62 wherein a training aircraft 64 is displayed in conjunction with the underlying terrain and various of the threats 66 encountered during the mission. On map 62, for convenience, each of threats 66 is identified by a particular subtitle. The threat presentations made to the crew during the mission are recreated by mock radar signal indicator 68 and speaker 70. Moreover, any of the crew's countermeasure activities in defeating the threat may be indicated both by video map 62 and various activities indicators 72. Indicators 72 could for example be lit at the moment the crew dropped chaff or activated radar jamming equipment aboard the aircraft during the mission.

Although the present invention has been described with reference to a preferred embodiment, numerous modifications, rearrangements and substitutions could be made, and the result would remain well within the scope of the invention.

What is claimed is:

1. A system operating to control the instruments of a fixed or rotary wing aircraft for providing inflight simulation of both stationary and nonstationary laser/electronic warfare threats to train crews in the use of electronic warfare countermeasure equipment and tactics, said system comprising:
    a plurality of independently operating transmitter units for transm line-of-sight radio frequency signals to simulate the threat; each of said signals being uniquely encoded with an identification code, said plurality including at least one transmitter unit for simulating a stationary threat and at least one transmitter unit for simulating a non-stationary threat; and
    on-board equipment, carried aboard the aircraft for detecting said threat simulating signals and controlling the aircraft radar warning system accordingly, said equipment including
    a receiver capable of receiving said signals from said threat simulating transmitter units when said transmitter units are within the transmitting range and the line-of-sight therewith; and
    a controller, responsive to said received signals, for controlling the instruments of the aircraft in response thereto, said controller causing the instruments to present the threats to the aircrew whenever the threats are within presentation range of, and the line-of-sight to the aircraft.

2. A system as claimed in claim 1 wherein said encoded signal for each of said non-stationary threats further comprises data representative of the location of the threat, said on-board equipment further comprising a memory for storing data representative of the location and identification of each stationary threat, said controller receiving data pertaining to the instantaneous position of the aircraft from the instruments whereby said controller determines the presentation ranges for each stationary threat from said aircraft position data and said location and identification data stored in said memory and said controller determines the presentation range for each non-stationary threat from said aircraft position data and said threat location and identification data encoded in said non-stationary threat simulating signal.

3. A system as claimed in claim 2 wherein each of said non-stationary threat simulating transmitter units comprises position locating device, said device encoding said encoded signals with said location data, said controller decoding said threat location and said threat identification data.

4. A system as claimed in claim 3 wherein said signals from all of said threat-simulating transmitter units are transmitted over a common frequency, are randomly-spaced and have a duration of about 5 to about 15 milliseconds.

5. A system as claimed in claim 3 wherein the aircraft instruments include a radar warning circuit having a visual display and an intercom system, said onboard equipment further comprising an interface communicatively connecting said controller to the warning circuit and the intercom system.

6. A system as claimed in claim 5 wherein said controller further receives data pertaining to the instantaneous heading of the air from the instruments, said controller causing said visual display to present the relative range an direction of the aircraft with respect to the threat.

7. A system as claimed in claim 6 wherein said visual display comprises a strobe display.

8. A system as claimed in claim 2 further comprising recording means operable by said control means, for recording mission data for reconstructing the training mission.

9. In combination with a helicopter having instruments for controlling the helicopter, a system operable with the instruments of said helicopter and adapted to control the instruments for providing inflight simulation of laser/electronic warfare threats to train crews in the use of electronic warfare countermeasure equipment and tactics, said system comprising:
a plurality of independently operating transmitter units for transmitting radio frequency signals having line-of-sight characteristics to simulate the threats, each of said signals being uniquely encoded with an identification code, said plurality including at least one transmitter unit for simulating a stationary threat and at least one transmitter unit for simulating a non-stationary threat, said non-stationary threat simulating transmitter transmitting an encoded signal; and
on-board equipment, carried aboard the helicopter for detecting said threat simulating signals and controlling the helicopter radar warning instruments accordingly, said equipment including
a receiver capable of receiving said signals from said threat simulating transmitter units when said transmitter units are within the transmitting range and the line-of-sight therewith, and
a controller, responsive to said received signals, for controlling the instruments of the helicopter in response thereto, said controller causing the instruments to present the threat to the aircrew whenever the threats are within presentation range, and the line-of-sight to the helicopter.

10. The combination as claimed in claim 9 wherein said signals from said transmitter units are omnidirectional.

11. The combination as claimed in claim 10, wherein said encoded signal for each non-stationary threat further comprises data representative of the location of the threat, said on-board equipment further comprising a memory for storing data representative of the location and identification of each stationary threat, said controller receiving data pertaining to the instantaneous position of the helicopter from the instrument whereby said controller determines the presentation range for each stationary threat from said helicopter position data and said location and identification data stored in said memory and said controller determines the presentation range for each non-stationary threat from said helicopter position data and said threat location and identification data encoded in said non-stationary threat simulating signal.

12. The combination as claimed in claim 11 wherein each of said non-stationary threat simulating transmitter units comprises a position locating device, said device encoding said encoded signals with said location data, said controller decoding said threat location and said threat identification data.

13. The combination as claimed in claim 12 wherein said signals from all of said threat-simulating transmitter units are transmittable over a common frequency, are randomly-spaced and have a duration of about 5 to about 10 milliseconds.

14. The combination as claimed in claim 13 wherein the helicopter radar warning instruments include a radar warning circuit having a visual display and an intercom system, said on-board equipment further comprising an interface communicatively connecting said controller to the warning circuit and the intercom system.

15. The combination as claimed in claim 14 wherein said controller further receives data pertaining to the instantaneous heading of the aircraft from the instruments, said controller causing said visual display to present the relative range and direction of the aircraft with respect to the threat.

16. A method of training crews aboard an aircraft in the use of electronic warfare countermeasure equipment and tactics to react to simulated laser/electronic warfare threats including stationary and non-stationary threats, said method comprising the steps of:
providing a memory aboard the aircraft and preloading said memory with threat identification and threat location data for each stationary threat to be simulated;
providing radio frequency signals for each of the threats to be simulated, all of said signals having a unique code providing data identifying the threat and each of said signals provided for a non-stationary threat having a code providing data pertaining to the location of each simulated non-stationary threat;
receiving said transmission signals aboard the aircraft, when the aircraft is within the line-of-sight and the transmitting range of each simulated threat;
decoding said signals received from said stationary threats to determine the identity of the threat therefrom;
decoding said signals received from said non-stationary threats to determine the location and the identity of the threat therefrom;
receiving data pertaining to the aircraft position and heading from the instruments of the aircraft;
determining from said aircraft position and heading data and said preloaded threat identification and location data whether the aircraft is within both the line-of-sight and the presentation range of a stationary threat;
determining from said aircraft position and heading data and said decoded threat identification and location data whether the aircraft is within both the line-of-sight and the presentation range of a non-stationary threat; and
causing the threat to be presented over the instruments of the aircraft whenever the threat is within the line-of-sight and the presentation range thereof.

17. The method as claimed in claim 16 further comprising the steps of recording the training mission and replaying said mission to the crew.

18. A system operable with the instruments of an aircraft to control the instruments for providing inflight simulation of laser/electronic warfare threats to train crews in the use of electronic warfare countermeasure equipment and tactics, said system comprising:
- at least one independently operating transmitter for transmitting a radio frequency signal having line-of-sight characteristics to simulate a threat, said signal being omni-directional and having at least a unique identification code;
- a receiver, carried aboard the aircraft, for receiving said signal from said transmitter;
- a memory for storing data pertaining to at least the identification of said at least one threat, said threat identification data being preload into said memory;
- control means responsive to said received signal for controlling the instruments of the aircraft in response thereto, said control means decoding said signal, receiving data pertaining to the position and heading of the aircraft from the aircraft instruments, and comparing said threat identification data from said memory with said aircraft position and heading data to determine whether the aircraft is within the line-of-sight, and presentation range to the threat;
- and means for interfacing said control means with the aircraft instruments, said control means causing the aircraft instruments to present the threat to the crew, said control means causing the relative distance and direction of the aircraft with respect to the threat to be presented.

19. A system as claimed in claim 18 further comprising recording means operable by said control means.

20. A system as claimed in claim 19, further comprising another transmitter unit, said other transmitter unit including a position locating device for determining the instantaneous position of said other transmitter and generating data indicative thereof, said other transmitter unit broadcasting said position data with said identification data over said radio frequency signal, said radio frequency signal from said other transmitter being received by said receiver, said control means comparing said threat location and identification data from said other transmitter with said aircraft position and heading data to determine whether the aircraft is within the line-of-sight, and presentation range to the threat.

* * * * *